United States Patent Office 3,434,844
Patented Mar. 25, 1969

3,434,844
STABILIZATION OF ANIMAL AND POULTRY FEEDS CONTAINING A TETRACYCLINE ANTIBIOTIC
Irving Klothen, Princeton, Robert Berendt Fortenbaugh, Gladstone, and Anthony Abbey, Jamesburg, N.J., assignors to American Cyanamid Company, Stamford, Conn., a corporation of Maine
No Drawing. Filed Jan. 21, 1964, Ser. No. 339,094
Int. Cl. A23k 1/17; A61k 21/02
U.S. Cl. 99—2     8 Claims

ABSTRACT OF THE DISCLOSURE

Preparation of an animal feed composition comprising an animal feed stuff containing a tetracycline-type antibiotic in which the antibiotic potency is maintained for extended periods of time by heating the fermentation mash liquor containing the antibiotic and prior to harvest thereof at a temperature between about 75°–120° C. for a period of time of at least about three minutes so as to stabilize the fermentation mash.

---

This invention relates to the stabilization of animal and poultry feed supplements and to animal and poultry feeds containing a tetracycline type antibiotic and more particularly is concerned with a novel process of preparing animal feed supplements and/or animal feeds which are stable upon prolonged storage against loss of antibiotic potency.

In present years the use of antibiotics in animal feeds for improving growth characteristics and efficiency of feed utilization has become of considerable economic importance. One of the best of such procedures is described in the United States patent to Jukes No. 2,619,420 which involves the addition to animal feeds of the antibiotics produced by fermentation of an aqueous nutrient medium with the microorganism *Streptomyces aureofaciens*. In practice, the fermentation mash solids are harvested, after the fermentation has been continued for the requisite length of time, and dried. The dried harvest mash solids containing the antibiotic, usually chlortetracycline, can be used as an animal feed supplement or the solids may be blended with conventional animal feed materials to produce a nutritionally-balanced growth-accelerating animal feed.

The use of the dried chlortetracycline-containing fermentation harvest mash solids as an animal or poultry feed supplement has from the beginning presented very vexing problems particularly the loss of potency of the antibiotic in the feed or feed supplement upon prolonged storage particularly under conditions of relatively high temperature and humidity. This loss of antibiotic potency, and which frequently runs as high as 20% over a one-year storage period, has heretofore necessitated the addition of a suitable overage of dried harvest mash antibiotic-containing solids to the animal feed blend so as to maintain the antibiotic potency during storage. Such a procedure is unsatisfactory and among other things results in higher than desired manufacturing costs for these animal feed supplements.

The present invention is based on the surprising discovery that following completion of the fermentation and before harvest, if the fermentation mash liquor is heated to a temperature between about 75–120° C., or higher, for a period of time of at least about three minutes, the resulting fermentation mash solids when harvested are stable against loss in antibiotic potency when blended with conventional poultry or animal feed materials to produce a nutritionally-balanced growth-acceleratnig antibiotic containing animal feed.

It is not known with certainty why this heating step produces such a remarkable improvement in stability of the antibiotic containing feed supplements and/or animal feeds but it is believed that it may result from a coagulation of the proteinaceous material in the fermetnation mash causing an increase in average particle size.

As indicated above, following the novel heating step of this invention the fermentation mash is harvested in the usual manner. Customarily this is done by adding a filter aid such as diatomaceous earth to the mash at the prevailing pH, that is about pH 6–8. The solids are collected by filtration and dried to produce the antibiotic-containing feed supplement.

It has also been found that if the dried feed supplement is crushed to a suitable particle size additional stability is imparted to the resulting product. In this connection it has been found that a supplement having an average particle size of plus 325 mesh or approximately 44 microns reduces loss of antibiotic potency by approximately 20% over similar material having a particle size of minus 325 mesh or approximately 20 microns. In a preferred embodiment, the present invention contemplates the production of the dried mash solids having a particle size no smaller than about 44 microns (plus 325 U.S. screen) and preferably from 44 to 600 microns (30 U.S. screen). Conveniently, this may be accomplished by crushing the fermentation solids in a hammer mill or other comminuting device.

The invention will be described in greater detail in conjunction with the following specific examples.

EXAMPLE 1

The following test was carried out to determine the effect of heat treating a chlortetracycline containing fermentation mash prior to harvesting thereof.

Approximately 100 ml. of fermentation harvest mash obtained as a result of *Streptomyces aureofaciens* strain A–377 fermentation for 120 hours at 28° C. were withdrawn from the vats upon completion of the fermentation process and prior to harvesting of the mesh. These samples were placed in beakers, 20 ml. of water were added thereto, and the pH of the mixtures ascertained. In substantially most instances the pH value ranged between 5.2 and 6.5. Following pH measurement, a sufficient quantity of an alkali metal hydroxide, i.e., sodium hydroxide, was added to each beaker to adjust the pH of the mixture to between 7 and 7.2. The mixtures were stirred and heated to between 90° C. and 100° C. and maintained at this tempertaure for approximately 5 minutes. They were then cooled to room temperature and, where required, the pH readjusted to between 7 and 7.2. 1.5 grams of a filter aid, i.e., Celite No. 512, was dispersed throughout each of the various mixtures and the mixtures were individually filtered through a Whatman No. 1 filter paper previously coated with 1.5 grams of filter aid. The filter cake obtained from each of the filtered mixtures was placed in petri dishes and dried in a vacuum oven for approximately 22 hours at about 55° C. and at 25 inches of vacuum. The dried cakes were then separately ground, resuspended in water, and 13 ml. samples from each of the above filter cakes were placed in individual test tubes. To each of these prepared samples were added 10 grams of a commercial poultry feed containing approximately 20% crude protein, a minimum of 4% crude fat and a maximum of 5% crude fiber. In addition, the feed contained riboflavin supplement, deactivated animal sterol, vitamin A oil, meat and bone scrap, soybean oil meal, dehydrated alfalfa meal, corn meal, hominy feed, wheat standard middlings, feeding cane molasses, low fluorine rock phosphate, calcium carbonate, manganese sulfate, iodized salt, calcium pantothenate, niacin, and animal fat.

Control samples from each treatment were prepared in the same manner as described above but no poultry feed was added to the 13 ml. aliquots taken from the prepared filter cake mixtures. Following preparation of controls and treated samples, all test tubes were capped and stored at 56° C. for 3 days. They were then removed from storage and the contents of each tube assayed microbiologically for chlortetracycline content. Storage of samples at 56° C. in the presence of water and feed, constitutes accelerated test conditions designed to produce results equivalent to the results one would expect to obtain on continued storage under severe field conditions.

From the data provided in the table below it can be noted that in each instance storage of the chlortetracycline-containing feed supplement in the presence of an animal feed produced some loss of potency. It can also be noted that in each instance, however, the product prepared in accordance with the present invention was substantially more stable even under these extreme conditions than were the products prepared by the conventional procedures, i.e., without heating the fermentation mash.

TABLE 1

| Preparation of Supplement by Fermentation Process and by Instant Invention, Filtered and Dried | | | Preparation of Samples for Tests, Filter Cake Resuspended in H₂O | Chlortetracycline Microbioassay Test Tube Contents Mcg./Test Tube, Plain and with Poultry Feed Added Assayed 3 Days After Storage at 56° C. | |
|---|---|---|---|---|---|
| Ml. Mash | Heat | Filter Aid | Ml./Test Tube | Plain, No Feed Added | Feed Added 10 g. per Test Tube |
| 60 ml. CTC | None | 3 g. Celitie No. 512 | 13 | 42,250 | 12,100 |
| Do | (¹) | do | 13 | 45,850 | 16,000 |
| Do | None | do | 13 | 46,250 | 19,100 |
| Do | (¹) | do | 13 | 61,750 | 23,000 |
| Do | None | do | 13 | 53,000 | 25,600 |
| Do | (¹) | do | 13 | 70,500 | 32,200 |
| Do | None | do | 13 | 39,000 | 27,975 |
| Do | (¹) | do | 13 | 67,750 | 34,250 |

¹ 90–100° C. for 5 min.

EXAMPLE 2

Following the procedure substantially as set forth in Example 1, 100 milliliters of liquid mash which had been prepared in accordance with conventional fermentation techniques were withdrawn from the fermentation vat just prior to harvesting. These samples were placed in containers, 1.5 grams of filter aid was added and the mixture placed in an autoclave, and heat treated at 121° C. for 3 minutes. They were then removed from the autoclave and permitted to cool and 10 grams of liquid mash was weighed into test tubes. Ten grams of feed was added as indicated in Table 2 and the samples were stored for 3 days at 56° C. When the accelerated test period was terminated, the samples were removed from storage and assayed microbiologically for chlortetracycline content.

Comparative test samples were prepared from same fermentation mash and treated in identical fashion excepting that such controls were not subjected to the autoclave treatment.

From the results set forth in Table 2 below, it is evident that heat treatment of fermentation mashes prior to harvesting results in increased stability of the mash. The data also demonstrate clearly increased stability of the mash stored in the presence of moisture and animal or poultry feed.

TABLE 2

| Preparation of Supplement by Fermentation Process and by Instant Invention | | | Chlortetracycline Micro bioassay Test Tube Contents Mcg./Test Tube—Plain and with Poultry Feed Added Assayed 3 Days After Storage at 56° C. | |
|---|---|---|---|---|
| Gm. Mash | Heat | Filter Aid | Plain, No Feed Added | Feed Added 10 g. per Test Tube |
| 10 gm. liquid mash | None | 1.5 g. Celite No. 512 | 82,250 | 44,250 |
| Do | (¹) | do | 93,250 | 49,750 |

¹ Autoclaved for 3 min. at 121° C.

EXAMPLE 3

Increased stability of animal feed supplements prepared in accordance with conventional fermentation processes and by the process of the instant invention can be further improved by controlling the particle size distribution of the dry filter cake. This is clearly demonstrated by the following tests wherein a filter cake (AFI) prepared by conventional procedures or prepared in accordance with the heated mash process was ground and sieved to separate various fractions of the product. Each fraction was weighed and mixed with sufficient poultry feed to achieve 200 g./ton CTC, or about .6% to 1.0% g. AFI/lb. feed, placed in a container and heated in an oven at 100° C. for 24 hours. Following heating the various samples were removed from the oven, cooled and the CTC content of the individual containers determined by microbiological assay.

From the results provided in the table below, it is observed that there is a substantial increase in the stability of the supplement, in finished feed, having a particle size greater than 60 microns. From the table below it is also noted that the differential in activity between the 20 and 60 micron size is maintained regardless of whether the product is prepared by simple grinding or by air milling.

TABLE 3

| U.S. Screen Size: | Average Particle Size (Microns) | Conventional Process AFI | | Air-Milled AFI | | Conventional Process AFI | | Air-Milled AFI | |
|---|---|---|---|---|---|---|---|---|---|
| | | Percent Weight | Percent CTC Recovery | Percent Weight | Percent CTC Recovery | Percent Weight | Percent CTC Recovery | Percent Weight | Percent CTC Recovery |
| 40 | 630 | 15.75 | 56.4 | 14.12 | 56 | 4.0 | 47.4 | 1.16 | 53 |
| 60 | 335 | 21.9 | 51.8 | 16.48 | 57.5 | 9.62 | 45.8 | 2.9 | 50 |
| 100 | 200 | 14.51 | 57.6 | 15.2 | 60.5 | 12.72 | 44.9 | 4.3 | 43.2 |
| 200 | 112 | 14.28 | 53.7 | 15.98 | 57 | 11.67 | 39.9 | 2.9 | 49.5 |
| 325 | 60 | 9.07 | 52.6 | 6.72 | 55 | 5.5 | 36.9 | 4.22 | 39 |
| −325 | 20 | 24.49 | 29.6 | 31.5 | 34.8 | 56.49 | 19.8 | 84.52 | 12.8 |

We claim:

1. A process for the production of a stabilized dried fermentation harvest mash solids animal feed supplement containing a tetracycline antibiotic which comprises heating a fermentation mash liquor containing said antibiotic, prior to harvest thereof, to a temperature between about 75–120° C. for a period of time of at least about three minutes so as to stabilize the mash solids against loss in antibiotic potency and drying said mash.

2. A process according to claim 1 in which the tetracycline antibiotc is chlortetracycline.

3. A process according to claim 1 in which the tetracycline antibiotic is tetracycline.

4. A process according to claim 1 in which the tetracycline antibiotic is oxytetracycline.

5. A process according to claim 1 in which the tetracycline antibiotic is dimethylchlortetracycline.

6. A process according to claim 1 in which the dried solids are milled to produce a particle size of between about 44 and 600 microns.

7. A process for the production of an animal feed composition comprising a nutritionally-balanced animal feed containing chlortetracycline which comprises heating a fermentation mash liquor containing said chlortetracycline and prior to harvest thereof at a temperature between about 75–120° C. for a period of time of at least about three minutes and adding said mash solids to a major amount of a nutritionally-balanced animal feed whereby the fermentation mash solids containing said chlortetracycline will be stable against losses in antibiotic potency for extended periods of time.

8. An animal feed composition prepared according to claim 7.

References Cited

UNITED STATES PATENTS

| 2,644,783 | 7/1953 | Weidenheimer et al. |
| 2,699,054 | 1/1954 | Conover. |
| 2,763,681 | 9/1956 | Starbird et al. |
| 2,878,289 | 3/1959 | McCormick et al. |
| 3,157,512 | 11/1964 | Muller. |
| 2,847,471 | 8/1958 | Vandeputte et al. __ 195—80 XR |

FOREIGN PATENTS

| 548,652 | 11/1957 | Canada. |
| 814,671 | 6/1959 | Great Britain. |

RAYMOND N. JONES, *Primary Examiner.*

H. H. KLARE III, *Assistant Examiner.*

U.S. Cl. X.R.

99—4; 260—999